(12) United States Patent
Yeo et al.

(10) Patent No.: US 12,141,431 B2
(45) Date of Patent: Nov. 12, 2024

(54) DISPLAY DEVICE

(71) Applicant: LG Display Co., Ltd., Seoul (KR)

(72) Inventors: Junho Yeo, Seoul (KR); YongMin Ha, Seoul (KR); Hanwook Hwang, Paju-si (KR); ChangHeon Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/065,613

(22) Filed: Dec. 13, 2022

(65) Prior Publication Data

US 2023/0205415 A1    Jun. 29, 2023

(30) Foreign Application Priority Data

Dec. 28, 2021 (KR) .......................... 10-2021-0189513

(51) Int. Cl.
*G06F 3/0488* (2022.01)
*G02F 1/00* (2006.01)
*G06F 1/16* (2006.01)

(52) U.S. Cl.
CPC .......... *G06F 3/0488* (2013.01); *G02F 1/0018* (2013.01); *G06F 1/1652* (2013.01); *G06F 1/1656* (2013.01)

(58) Field of Classification Search
CPC .... G06F 1/1652; G06F 1/1637; G06F 3/0488; G06F 1/1656; G02F 1/0018
See application file for complete search history.

(56) References Cited

U.S. PATENT DOCUMENTS

| | | | |
|---|---|---|---|
| 10,061,356 B2* | 8/2018 | Jin | G06F 1/1637 |
| 11,675,450 B2* | 6/2023 | Ryu | H10K 71/00 |
| | | | 345/173 |
| 11,711,962 B2* | 7/2023 | Kim | H10K 59/131 |
| | | | 257/40 |
| 11,737,323 B2* | 8/2023 | Cho | G09G 3/3275 |
| | | | 361/679.02 |
| 2012/0175297 A1* | 7/2012 | Schnipke | B01D 35/0273 |
| | | | 210/484 |
| 2020/0273927 A1* | 8/2020 | Oh | H10K 59/121 |
| 2021/0074777 A1* | 3/2021 | Chen | H10K 59/8792 |
| 2021/0132726 A1* | 5/2021 | Ryu | G06F 1/1652 |
| 2021/0201711 A1* | 7/2021 | Yun | G09F 9/301 |
| 2021/0202623 A1* | 7/2021 | Lee | H10K 59/00 |
| 2021/0202657 A1* | 7/2021 | Cho | G09G 3/3233 |
| 2022/0181399 A1* | 6/2022 | Shim | H10K 59/131 |
| 2024/0057449 A1* | 2/2024 | Peng | H10K 59/65 |

FOREIGN PATENT DOCUMENTS

CN    111029392    *    4/2000    ............. H10K 59/12

* cited by examiner

*Primary Examiner* — Olga V Merkoulova
(74) *Attorney, Agent, or Firm* — Seed IP Law Group LLP

(57) ABSTRACT

Embodiments of the disclosure relate to a display device. Specifically, there is provided a display device with display quality enhanced by comprising a substrate, a display area where one or more subpixels are disposed, each of the one or more subpixels including a light emitting element positioned on the substrate and at least one transistor for driving the light emitting element, an open area obtained by removing at least a portion of the substrate in an area surrounded by the display area, and a planarization layer positioned to overlap the display area and the open area and positioned on the light emitting element.

20 Claims, 10 Drawing Sheets

DISPLAY DEVICE

CROSS-REFERENCE TO RELATED APPLICATION

This application claims priority from Korean Patent Application No. 10-2021-0189513, filed on Dec. 28, 2021, which is hereby incorporated by reference for all purposes as if fully set forth herein.

BACKGROUND

Technical Field

Embodiments of the disclosure relate to display devices.

Description of the Related Art

With the development of technology, the display device may provide a capture function and various detection functions in addition to an image display function. To this end, the display device includes an electro-optical device (also referred to as a light receiving device or sensor), such as a camera and a detection sensor.

Since the electro-optical device receives light from the front of the display device, it should be installed where light reception is easy. Accordingly, the camera (camera lens) and the detection sensor may be exposed on the front surface of the display device. Thus, the bezel of the display panel is widened or a notch is formed in the display area of the display panel, and a camera or a detection sensor is installed there.

When the bezel is broadened or a notch is formed in the front surface of the display panel, the display area for displaying images on the display panel may be reduced.

Being proposed are "hole in active area (HiAA)"-type display devices with a display area increased by removing at least a portion of the substrate in the display area of the display panel and placing the electro-optical device to overlap the area where the removed portion of the substrate is positioned.

Such a "hole in active area (HiAA)"-type display device may include an open area where at least a portion of the substrate has been removed in the display panel.

BRIEF SUMMARY

The inventors have realized that display quality may be deteriorated around the open area due to a step caused by the removal of the substrate. Accordingly, a need exists for a display device capable of enhancing the display quality around the open area.

Embodiments of the disclosure may provide a display device with enhanced display quality around an open area.

Embodiments of the disclosure may provide a display device comprising a substrate, a display area having one or more subpixels disposed therein, each of the one or more subpixels including a light emitting element positioned on the substrate and at least one transistor for driving the light emitting element, an open area formed by removing at least a portion of the substrate in an area surrounded by the display area, and a planarization layer positioned to overlap the display area and the open area and positioned on the light emitting element.

According to embodiments of the disclosure, there may be provided a display device with enhanced display quality around an open area.

BRIEF DESCRIPTION OF THE SEVERAL VIEWS OF THE DRAWINGS

The above and other technical benefits, features, and advantages of the disclosure will be more clearly understood from the following detailed description, taken in conjunction with the accompanying drawings, in which.

DETAILED DESCRIPTION

Figure 1:
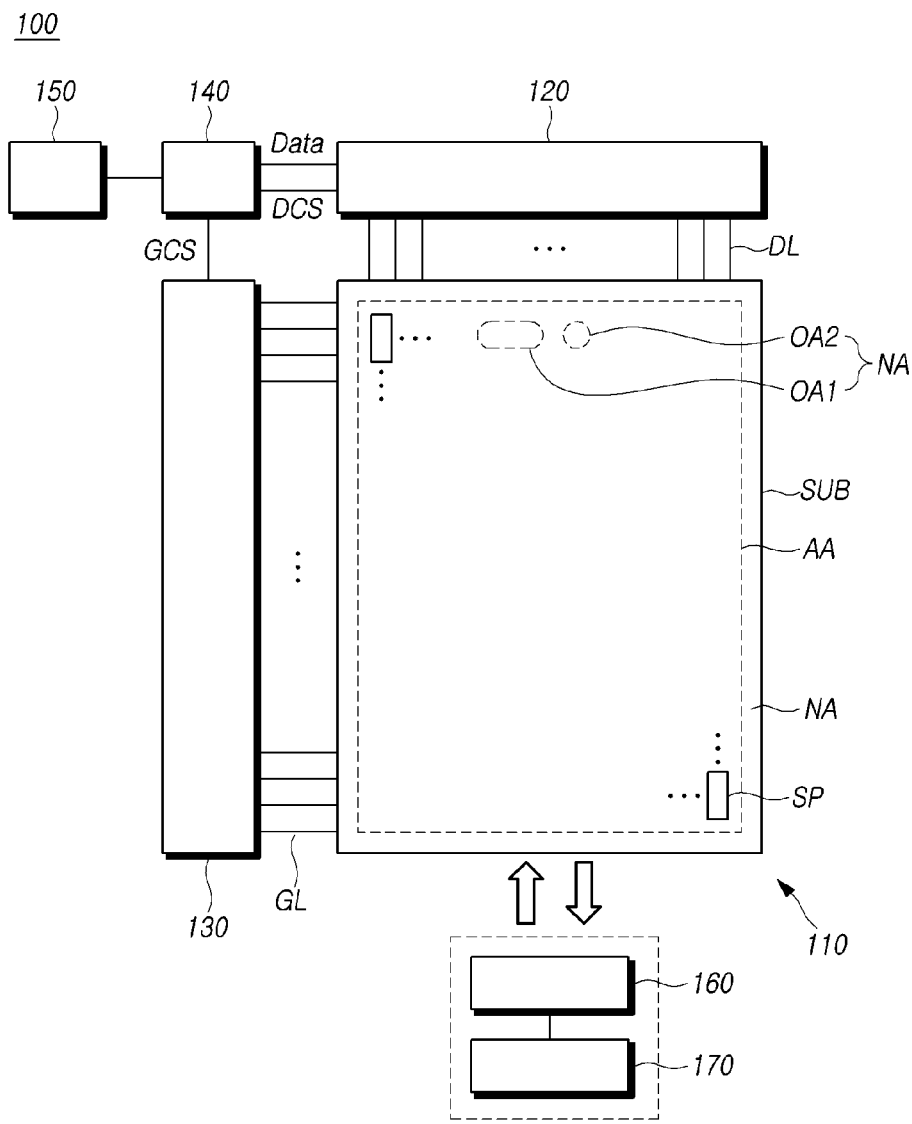
FIG. 1 is a view illustrating a system configuration of a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

FIG. 1 is a view illustrating a system configuration of a display device 100 according to embodiments of the disclosure.

Referring to FIG. 1, the display device 100 may include a display panel 110 and a display driving circuit as components for displaying an image.

The display driving circuits are circuits for driving the display panel 110 and may include a data driving circuit 120, a gate driving circuit 130, and a display controller 140.

The display panel 110 may include a display area AA in which images are displayed and a non-display area NA in which no image is displayed. The non-display area NA may be an outer area of the display area AA and be referred to as a bezel area. The whole or part of the non-display area NA may be an area visible from the front surface of the display device 100 or an area that is bent and not visible from the front surface of the display device 100.

The display panel 110 may include a substrate SUB and a plurality of subpixels SP disposed on the substrate SUB. The display panel 110 may further include various types of signal lines to drive the plurality of subpixels SP.

The display device 100 according to embodiments of the disclosure may be a liquid crystal display device or a light emission display device in which the display panel 110 emits light by itself. When the display device 100 according to the embodiments of the disclosure is a self-emission display device, each of the plurality of subpixels SP may include a light emitting element.

For example, the display device 100 according to embodiments of the disclosure may be an organic light emitting diode display in which the light emitting element is implemented as an organic light emitting diode (OLED). As another example, the display device 100 according to embodiments of the disclosure may be an inorganic light emitting display device in which the light emitting element is implemented as an inorganic material-based light emitting diode. As another example, the display device 100 according to embodiments of the disclosure may be a quantum dot display device in which the light emitting element is implemented as a quantum dot which is self-emission semiconductor crystal.

The structure of each of the plurality of subpixels SP may vary according to the type of the display device 100. For example, when the display device 100 is a self-emission display device in which the subpixels SP emit light by themselves, each subpixel SP may include a light emitting element that emits light by itself, one or more transistors, and one or more capacitors.

For example, various types of signal lines may include a plurality of data lines DL transferring data signals (also referred to as data voltages or image signals) and a plurality of gate lines GL transferring gate signals (also referred to as scan signals).

The plurality of data lines DL and the plurality of gate lines GL may cross each other. Each of the plurality of data lines DL may be disposed while extending in a first direction. Each of the plurality of gate lines GL may be disposed while extending in a second direction.

Here, the first direction may be a column direction and the second direction may be a row direction. Otherwise, the first direction may be the row direction, and the second direction may be the column direction.

The data driving circuit 120 is a circuit configured to drive the plurality of data lines DL, and may output data signals to the plurality of data lines DL. The gate driving circuit 130 is a circuit configured to drive the plurality of gate lines GL, and may output gate signals to the plurality of gate lines GL.

The display controller 140 may be a device configured to control the operation of the data driving circuit 120 and the gate driving circuit 130. The display controller 140 may control driving timings for the plurality of data lines DL and driving timings for the plurality of gate lines GL.

The display controller 140 may supply the data driving control signal DCS to the data driving circuit 120 to control the data driving circuit 120. The display controller 140 may supply the gate driving circuit control signal GCS to the gate driving circuit 130 to control the gate driving circuit 130.

The display controller 140 may receive input image data from the host system 150 and supply image data Data to the data driving circuit 120 based on the input image data.

The data driving circuit 120 may supply data signals to the plurality of data lines DL according to the driving timing control of the display controller 140.

The data driving circuit 120 may receive digital image data Data from the display controller 140 and may convert the received image data Data into analog data signals and output them to the plurality of data lines DL.

The gate driving circuit 130 may supply gate signals to the plurality of gate lines GL according to the timing control of the display controller 140. The gate driving circuit 130 may receive a first gate voltage corresponding to a turn-on level voltage and a second gate voltage corresponding to a turn-off level voltage, along with various gate driving circuit control signals GCS, generate gate signals, and supply the generated gate signals to the plurality of gate lines GL.

For example, the data driving circuit 120 may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 130 may be connected with the display panel 110 by a tape automated bonding (TAB) method or connected to a bonding pad of the self-emission display panel 110 by a COG or chip on panel (COP) method or may be connected with the display panel 110 according to a COF method. The gate driving circuit 130 may be formed in a gate in panel (GIP) type, in the non-display area NA of the display panel 110. The gate driving circuit 130 may be disposed on the substrate SUB or may be connected to the substrate SUB. In other words, the gate driving circuit 130 that is of a gate in panel (GIP) type may be disposed in the non-display area NA of the substrate SUB. The gate driving circuit 130 that is of a chip-on-glass (COG) type or chip-on-film (COF) type may be connected to the substrate.

Meanwhile, at least one of the data driving circuit 120 and the gate driving circuit 130 may be disposed in the display area AA of the display panel 110. For example, at least one of the data driving circuit 120 and the gate driving circuit 130 may be disposed not to overlap the subpixels SP or to partially or entirely overlap the subpixels SP.

The data driving circuit 120 may be connected with one side (e.g., an upper or lower side) of the display panel 110. Depending on the driving scheme or the panel design scheme, the data driving circuit 120 may be connected with both sides (e.g., upper and lower sides) of the self-emission display panel 110, or two or more of the four sides of the self-emission display panel 110.

The gate driving circuit 130 may be connected with one side (e.g., a left or right side) of the display panel 110. Depending on the driving scheme or the panel design scheme, the gate driving circuit 130 may be connected with both sides (e.g., left and right sides) of the display panel 110, or two or more of the four sides of the display panel 110.

The display controller 140 may be implemented as a separate component from the data driving circuit 120, or the display controller 140 and the data driving circuit 120 may be integrated into an integrated circuit (IC).

The display controller 140 may be a timing controller used in typical display technology, a control device that may perform other control functions as well as the functions of the timing controller, or a control device other than the timing controller, or may be a circuit in the control device. The display controller 140 may be implemented as various circuits or electronic components, such as an integrated circuit (IC), a field programmable gate array (FPGA), an application specific integrated circuit (ASIC), or a processor.

The display controller 140 may be electrically connected to the data driving circuit 120 and the gate driving circuit 130 through a printed circuit board (PCB) or a flexible printed circuit board (FPCB).

The display controller 140 may transmit/receive signals to/from the data driving circuit 120 according to one or more predetermined or selected interfaces. The interface may include, e.g., a low voltage differential signaling (LVDS) interface, an EPI interface, and a serial peripheral interface (SPI).

Referring to FIG. 1, the display device 100 according to embodiments of the disclosure may include one or more open areas (OA) where at least a portion of the substrate SUB has been removed.

One or more electro-optical devices (not shown) may be disposed in an area at least partially overlapping the open area OA. For example, the one or more electro-optical devices may include one or more of a capture device, such as a camera (image sensor), and a detection sensor, such as a proximity sensor and an illuminance sensor.

For example, a capture device, such as a camera, may be positioned under a first open area OA1, and a detection sensor may be positioned under a second open area OA2.

The electro-optical device may be positioned under the substrate SUB. The electro-optical device may be positioned to at least partially overlap the open area OA.

The first open area OA1 and the second open area OA2 may have various shapes, such as a circle, an ellipse, a square, a hexagon, or an octagon. The shapes of the first open area OA1 and the second open area OA2 may be the same or different. The area of the first open area OA1 may be the same as or different from the area of the second open area OA2.

For convenience of description, an embodiment in which the shape of the first open area OA1 is elliptical and the shape of the second open area OA2 is circular is described below as an example, but the disclosure is not limited thereto.

At least one open area OA is positioned in the area where the substrate SUB has been removed, and the open area OA may be a non-display area NA where no subpixel SP is disposed.

The open area OA positioned in the display area AA is also referred to as a "hole in active area (HiAA)" area.

Signal lines (e.g., data lines DL or gate lines GL) disposed on the substrate SUB may be disposed around (or bypassing) the periphery of the open area OA.

To provide a touch sensing function as well as an image display function, the display device 100 according to embodiments of the disclosure may include a touch sensor and a touch sensing circuit that senses the touch sensor to detect whether a touch occurs by a touch object, such as a finger or pen, or the position of the touch.

The touch sensing circuit may include a touch driving circuit 160 that drives and senses the touch sensor and generates and outputs touch sensing data and a touch controller 170 that may detect an occurrence of a touch or the position of the touch using touch sensing data.

The touch sensor may include a plurality of touch electrodes. The touch sensor may further include a plurality of touch lines for electrically connecting the plurality of touch electrodes and the touch driving circuit 160.

The touch sensor in the form of a touch panel may exist outside the display panel 110, or the touch sensor may exist inside the display panel 110.

When the touch panel, in the form of a panel, exists outside the display panel 110, the touch panel is referred to as an external type. When the touch sensor is of the external type, the touch panel and the display panel 110 may be separately manufactured or may be combined during an assembly process. The external-type touch panel may include a touch panel substrate and a plurality of touch electrodes on the touch panel substrate.

When the touch sensor is present inside the display panel 110, the touch sensor may be formed on the substrate SUB, together with signal lines and electrodes related to display driving, during the manufacturing process of the display panel 110.

The touch driving circuit 160 may supply a touch driving signal to at least one of the plurality of touch electrodes and may sense at least one of the plurality of touch electrodes to generate touch sensing data.

The touch sensing circuit may perform touch sensing in a self-capacitance sensing scheme or a mutual-capacitance sensing scheme.

When the touch sensing circuit performs touch sensing in the self-capacitance sensing scheme, the touch sensing circuit may perform touch sensing based on capacitance between each touch electrode and the touch object (e.g., finger or pen).

According to the self-capacitance sensing scheme, each of the plurality of touch electrodes may serve both as a driving touch electrode and as a sensing touch electrode. The touch driving circuit 160 may drive all or some of the plurality of touch electrodes and sense all or some of the plurality of touch electrodes.

When the touch sensing circuit performs touch sensing in the mutual-capacitance sensing scheme, the touch sensing circuit may perform touch sensing based on capacitance between the touch electrodes.

According to the mutual-capacitance sensing scheme, the plurality of touch electrodes are divided into driving touch electrodes and sensing touch electrodes. The touch driving circuit 160 may drive the driving touch electrodes and sense the sensing touch electrodes.

The touch driving circuit 160 and the touch controller 170 included in the touch sensing circuit may be implemented as separate devices or as a single device. In addition, the touch driving circuit 160 and the data driving circuit 120 may be implemented as separate devices or as a single device.

The display device 100 may further include a power supply circuit for supplying various types of power to the display driver integrated circuit and/or the touch sensing circuit.

The display device 100 according to embodiments of the disclosure may be a mobile terminal, such as a smart phone or a tablet, or a monitor or television (TV) in various sizes but, without limited thereto, may be a display device in various types and various sizes capable of displaying information or images.

Figure 2:
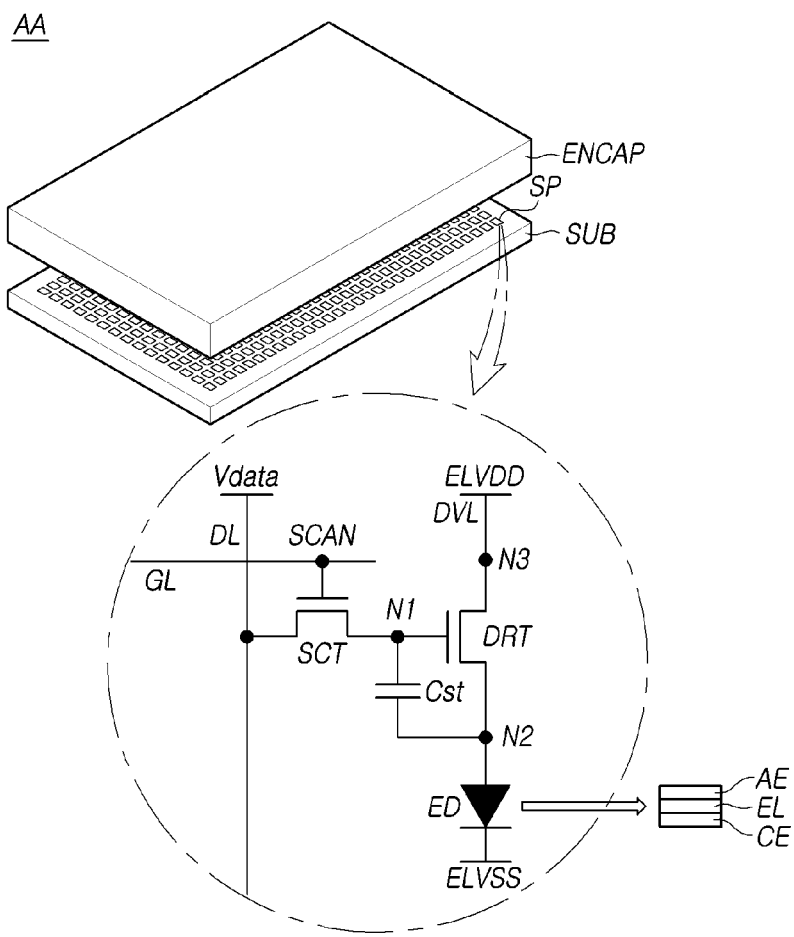
FIG. 2 is a view illustrating an equivalent circuit of a subpixel in a display panel according to embodiments of the disclosure.

FIG. 2 is a view illustrating an equivalent circuit of a subpixel SP in a display panel 110 according to embodiments of the disclosure.

Referring to FIG. 2, each subpixel SP in the display area AA of the display panel 110 may include a light emitting element ED, a driving transistor DRT for driving the light emitting element ED, a scan transistor SCT for transferring a data voltage Vdata to a first node N1 of the driving transistor DRT, and a storage capacitor Cst for maintaining a constant voltage during one frame.

The driving transistor DRT may include the first node N1 to which the data voltage Vdata may be applied, a second node N2 electrically connected with the light emitting element ED, and a third node N3 to which a high-potential common voltage ELVDD is applied from a driving voltage line DVL. The first node N1 in the driving transistor DRT may be a gate node, the second node N2 may be either a source node or a drain node, and the third node N3 may be the other of the source node and the drain node.

The light emitting element ED may include an anode electrode AE, a light emitting layer EL, and a cathode electrode CE. The anode electrode AE may be a pixel electrode disposed in each subpixel SP and be electrically connected to the second node N2 of the driving transistor DRT of each subpixel SP. The cathode electrode CE may be a common electrode commonly disposed in the plurality of subpixels SP, and a low-potential common voltage ELVSS may be applied thereto.

For example, the anode electrode AE may be a pixel electrode, and the cathode electrode CE may be a common electrode. Conversely, the anode electrode AE may be a common electrode, and the cathode electrode CE may be a pixel electrode. Hereinafter, for convenience of description, it is assumed that the anode electrode AE is a pixel electrode and the cathode electrode CE is a common electrode.

For example, the light emitting element ED may be an organic light emitting diode (OLED), an inorganic light emitting diode, or a quantum dot light emitting element. In this case, when the light emitting element ED is an organic light emitting diode, the light emitting layer EL of the light emitting element ED may include an organic light emitting layer including an organic material.

The on/off of the scan transistor SCT is controlled by the scan signal SCAN, which is a gate signal applied through the gate line GL. The scan transistor SCT may switch the electrical connection between the data line DL and the first node N1 of the driving transistor DRT.

The storage capacitor Cst may be electrically connected between the first node N1 and second node N2 of the driving transistor DRT.

Each subpixel SP may have a 2T (transistor) 1C (capacitor) structure which includes two transistors DRT and SCT and one capacitor Cst as shown in FIG. 2 and, in some cases, each subpixel SP may further include one or more transistors or one or more capacitors.

The capacitor Cst may be an external capacitor intentionally designed to be outside the driving transistor DRT, but not a parasite capacitor (e.g., Cgs or Cgd) which is an internal capacitor that may be present between the first node N1 and the second node N2 of the driving transistor DRT.

Each of the driving transistor DRT and the scan transistor SCT may be an n-type transistor or a p-type transistor.

Since the circuit elements (particularly, the light emitting element ED) in each subpixel SP are vulnerable to external moisture or oxygen, an encapsulation layer ENCAP may be disposed on the display panel 110 to prevent penetration of external moisture or oxygen into the circuit elements (particularly, the light emitting element ED). The encapsulation layer ENCAP may be disposed to cover the light emitting elements ED.

Figure 3:
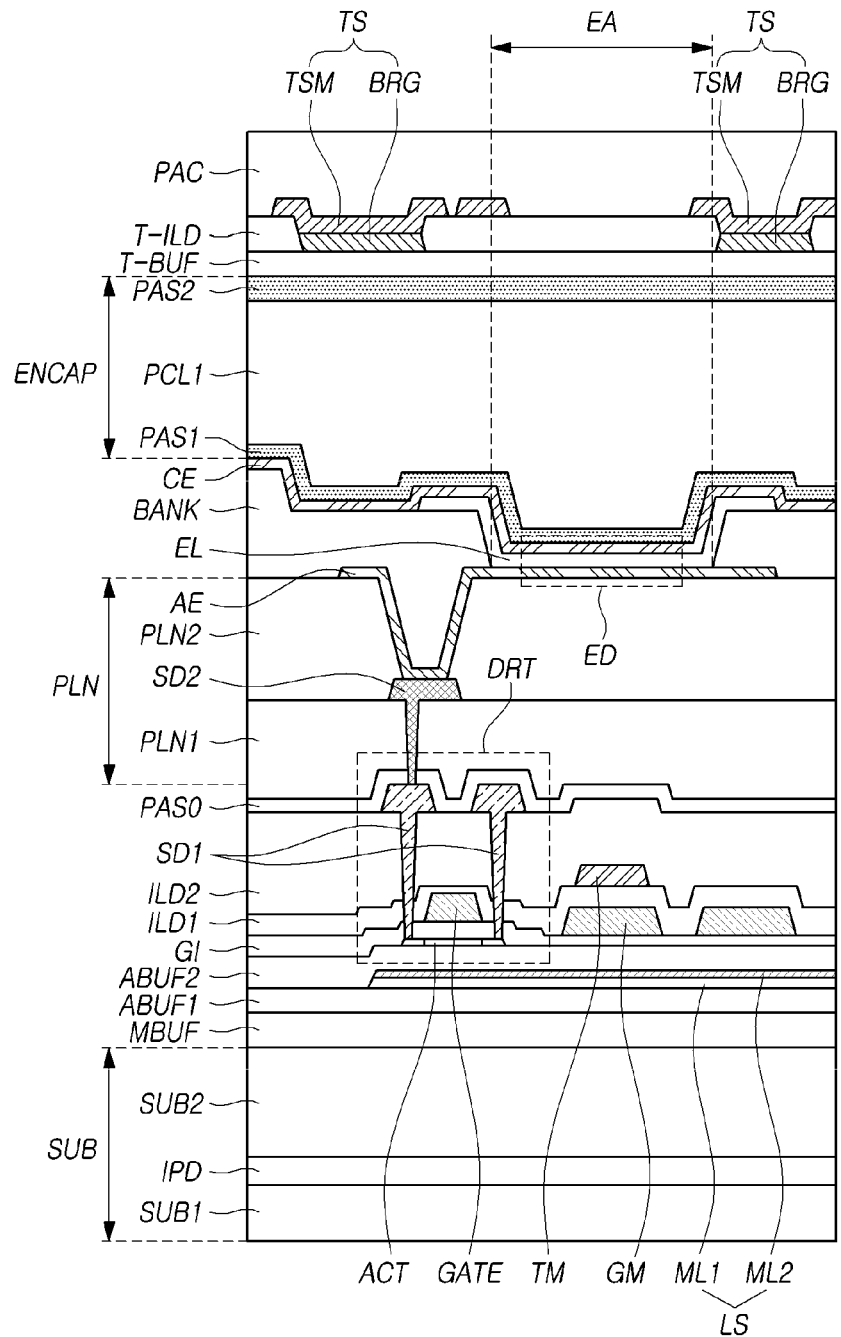
FIG. 3 is a cross-sectional view illustrating a display area of a display panel according to embodiments of the disclosure.

FIG. 3 is a cross-sectional view illustrating a display area AA of a display panel 110 according to embodiments of the disclosure.

Referring to FIG. 3, the substrate SUB may include a first substrate SUB1, an inter-layer insulation film IPD, and a second substrate SUB2. The inter-layer insulation film IPD may be positioned between the first substrate SUB1 and the second substrate SUB2. By configuring the substrate SUB with the first substrate SUB1, the inter-layer insulation film IPD and the second substrate SUB2, it is possible to prevent moisture penetration. For example, the first substrate SUB1 and the second substrate SUB2 may be polyimide (PI) substrates. The first substrate SUB1 may be referred to as a primary PI substrate, and the second substrate SUB2 may be referred to as a secondary PI substrate.

Referring to FIG. 3, on the substrate SUB, various patterns, e.g., various patterns ACT, SD1, and GATE for forming a transistor, such as a driving transistor DRT, various insulation films MBUF, ABUF1, ABUF2, GI, ILD1, ILD2, and PAS0, and various metal patterns TM, GM, ML1, and ML2 may be positioned.

Referring to FIG. 3, a multi-buffer layer MBUF may be disposed on the second substrate SUB2. A first active buffer layer ABUF1 may be disposed on the multi-buffer layer MBUF.

A first metal layer ML1 and a second metal layer ML2 may be disposed on the first active buffer layer ABUF1. The first metal layer ML1 and the second metal layer ML2 may be a light shield layer LS for shielding light.

A second active buffer layer ABUF2 may be disposed on the first metal layer ML1 and the second metal layer ML2.

A gate insulation film GI may be disposed while covering the active layer ACT.

A gate electrode GATE of the driving transistor DRT may be disposed on the gate insulation film GI.

The first inter-layer insulation film ILD1 may be disposed while covering the gate electrode GATE and the gate material layer GM. A metal pattern TM may be disposed on the first inter-layer insulation film ILD1. The metal pattern TM may be located in a position different from the position where the driving transistor DRT is formed. The second inter-layer insulation film ILD2 may be disposed while covering the metal pattern TM on the first inter-layer insulation film ILD1.

Two first source-drain electrode material patterns SD1 may be disposed on the second inter-layer insulation film ILD2. One of the two first source-drain electrode material patterns SD1 is the source node of the driving transistor DRT, and the other is the drain node of the driving transistor DRT.

The two first source-drain electrode material patterns SD1 may be electrically connected with the two opposite sides of the active layer ACT through the contact hole of the second inter-layer insulation film ILD2, the first inter-layer insulation film ILD1, and the gate insulation film GI.

A portion of the active layer ACT overlapping the gate electrode GATE is a channel area. One of the two first source-drain electrode material patterns SD1 may be connected to one side of the channel area in the active layer ACT, and the other one of the two first source-drain electrode material patterns SD1 may be connected to the other side of the channel area in the active layer ACT.

A passivation layer PAS0 may be disposed while covering the two first source-drain electrode material patterns SD1. A planarization layer PLN may be disposed on the passivation layer PAS0. The planarization layer PLN may include a first planarization layer PLN1 and a second planarization layer PLN2. The planarization layer PLN may be an organic insulation film layer capable of performing a planarization function.

The first planarization layer PLN1 may be disposed on the passivation layer PAS0.

A second source-drain electrode material pattern SD2 may be disposed on the first planarization layer PLN1. The second source-drain electrode material pattern SD2 may be connected with one of the two first source-drain electrode material patterns SD1 (corresponding to the second node N2 of the driving transistor DRT in the subpixel SP of FIG. 2) through the contact hole of the first planarization layer PLN1.

The second planarization layer PLN2 may be disposed while covering the second source-drain electrode material pattern SD2. A light emitting element ED may be disposed on the second planarization layer PLN2.

In the stacked structure of the light emitting element ED, the anode electrode AE may be disposed on the second planarization layer PLN2. The anode electrode AE may be electrically connected to the second source-drain electrode material pattern SD2 through the contact hole of the second planarization layer PLN2.

The bank BANK may be disposed while covering a portion of the anode electrode AE. A portion of the bank BANK corresponding to the light emitting area EA of the subpixel SP may be opened.

A portion of the anode electrode AE may be exposed through an opening (open portion) of the bank BANK. A light emitting layer EL may be positioned on a side surface of the bank BANK and the opening (open portion) of the bank BANK. The whole or part of the light emitting layer EL may be positioned between adjacent banks BANK.

In the opening of the bank BANK, the light emitting layer EL may contact the anode electrode AE. A cathode electrode CE may be disposed on the light emitting layer EL.

The light emitting element ED may be formed by the anode electrode AE, the light emitting layer EL, and the cathode electrode CE. The light emitting layer EL may include an organic film.

An encapsulation layer ENCAP may be disposed on the above-described light emitting element ED.

The encapsulation layer ENCAP may have a single-layer structure or a multi-layer structure. For example, as illustrated in FIG. 3, the encapsulation layer ENCAP may include a first encapsulation layer PAS1, a second encapsulation layer PCL1, and a third encapsulation layer PAS2.

For example, the first encapsulation layer PAS1 and the third encapsulation layer PAS2 may be inorganic films, and the second encapsulation layer PCL1 may be an organic layer. Among the first encapsulation layer PAS1, the second encapsulation layer PCL1, and the third encapsulation layer PAS2, the second encapsulation layer PCL1 which is an organic film may be the thickest and play a role as a planarization layer.

The first encapsulation layer PAS1 may be disposed on the cathode electrode CE and be disposed closest to the light emitting element ED. The first encapsulation layer PAS1 may be formed of an inorganic insulating material capable of low-temperature deposition. For example, the first encapsulation layer PAS1 may be formed of silicon nitride (SiNx), silicon oxide (SiOx), silicon oxynitride (SiON), or aluminum oxide ($Al_2O_3$). Since the first encapsulation layer PAS1 is deposited in a low temperature atmosphere, the first encapsulation layer PAS1 may prevent damage to the light emitting layer EL including an organic material vulnerable to a high temperature atmosphere during the deposition process.

The second encapsulation layer PCL1 may have a smaller area than the first encapsulation layer PAS1. In this case, the second encapsulation layer PCL1 may be formed to expose two opposite ends of the first encapsulation layer PAS1. The second encapsulation layer PCL1 serves as a buffer for relieving stress between layers due to bending of the display device 100 and may also serve to enhance planarization performance. For example, the second encapsulation layer PCL1 may be an acrylic resin, an epoxy resin, polyimide, polyethylene, or silicon oxycarbonate (SiOC) and be formed of an organic insulating material. For example, the second encapsulation layer PCL1 may be formed through an inkjet scheme. The second encapsulation layer PCL1 is also referred to as a particle cover layer (PCL), and has an excellent planarization function. Accordingly, the second encapsulation layer PCL1 may compensate for the step of the lower layer and is suitable for providing a planarization function.

The third inorganic encapsulation layer PAS2 may be formed on the substrate SUB, where the second encapsulation layer PCL1 is formed, to cover the respective upper surfaces and side surfaces of the second encapsulation layer PCL1 and the first encapsulation layer PAS1. The third encapsulation layer PAS2 may minimize, reduce or block external moisture or oxygen from penetrating into the first inorganic encapsulation layer PAS1 and the second encapsulation layer PCL1. For example, the third encapsulation layer PAS2 may be formed of an inorganic insulating material, such as silicon nitride (SiNx), silicon oxide (SiOx), silicon oxynitride (SiON), or aluminum oxide ($Al_2O_3$).

A touch sensor TS may be disposed on the encapsulation layer ENCAP. The structure of the touch sensor TS is described below in detail.

A touch buffer film T-BUF may be disposed on the encapsulation layer ENCAP. A touch sensor TS may be disposed on the touch buffer film T-BUF.

The touch sensor TS may include a touch sensor metal TSM and a bridge metal BRG positioned on different layers.

A touch inter-layer insulation film T-ILD may be disposed between the touch sensor metal TSM and the bridge metal BRG.

For example, the touch sensor metals TSM may include a first touch sensor metal TSM, a second touch sensor metal TSM, and a third touch sensor metal TSM that are disposed adjacent to each other. The third touch sensor metal TSM is disposed between the first touch sensor metal TSM and the second touch sensor metal TSM and, when the first touch sensor metal TSM and the second touch sensor metal TSM are electrically connected to each other, the first touch sensor metal TSM and the second touch sensor metal TSM may be electrically connected to each other through the bridge metal BRG positioned on a different layer. The bridge metal BRG may be insulated from the third touch sensor metal TSM by the touch inter-layer insulation film T-ILD.

When the touch sensor TS is formed on the display panel 110, the chemical solution (e.g., developer or etchant) used in the process may be introduced or moisture may flow in from the outside. By disposing the touch sensor TS on the touch buffer film T-BUF, it is possible to prevent a chemical solution or moisture from penetrating into the light emitting layer EL including an organic material during the manufacturing process of the touch sensor TS. Thus, the touch buffer film T-BUF may prevent damage to the light emitting layer EL vulnerable to chemicals or moisture.

The touch buffer film T-BUF may be formed of an organic insulation material with a low permittivity of 1 to 3 and formed at a low temperature which is not more than a predetermined or selected temperature (e.g., 100° C.) to prevent damage to the light emitting layer EL containing the organic material vulnerable to high temperature. For example, the touch buffer film T-BUF may be formed of an acrylic-based or siloxane-based material. As the display device 100 is bent, the encapsulation layer ENCAP may be damaged, and the touch sensor metal positioned on the touch buffer layer T-BUF may be broken. Even when the display device 100 is bent, the touch buffer layer T-BUF formed of an organic insulating material and having planarization capability may prevent damage to the encapsulation layer ENCAP and/or breakage of the metals TSM and BRG constituting the touch sensor TS.

Referring to FIG. 3, a protection layer PAC may be disposed while covering the touch sensor TS. The protection layer PAC may be an organic insulation film. Such an organic insulation film may be the same material as the above-described planarization layer PLN, for example. The organic insulation film may be formed of a material different from that of the second encapsulation layer PCL1. For example, the protection layer PAC may include a thermosetting resin.

Figure 4:
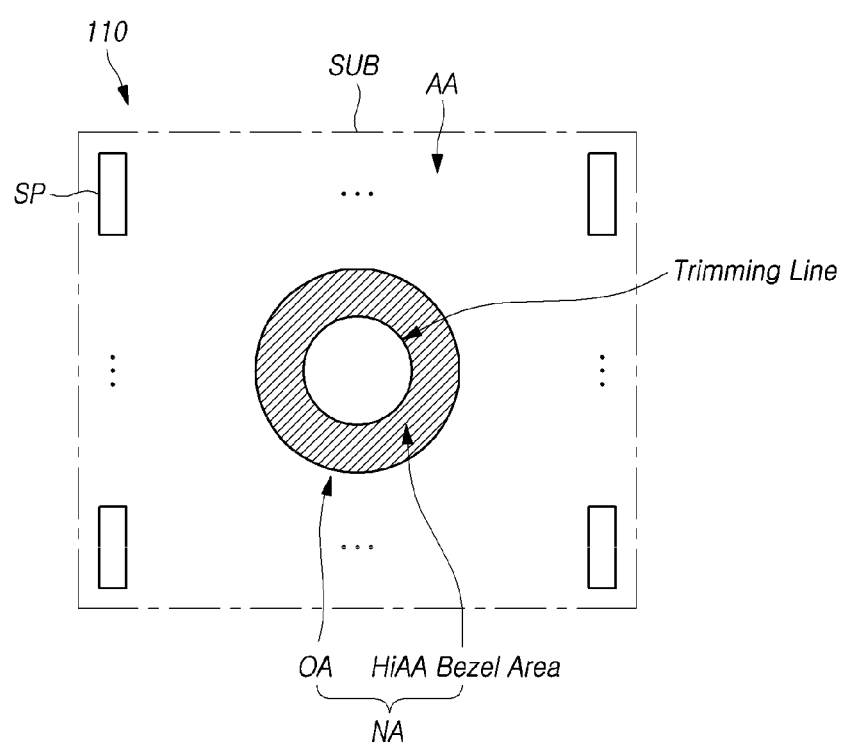
FIG. 4 is a view illustrating, in detail, an open area.

FIG. 4 is a view illustrating, in detail, an open area OA.

Referring to FIG. 4, the substrate SUB may be cut along a trimming line. A bezel area may be positioned outside the trimming line. The bezel area positioned between the outside of the trimming line and the display area AA is also referred to as a "HiAA bezel area".

In the "HiAA bezel area," a rough pattern (not shown) for preventing moisture permeation flowing in from the outside through the trimming line and microcracks may be disposed on the substrate SUB.

The open area OA including the "HiAA bezel area" may be a non-display area NA in which an image is not displayed.

Figure 5:
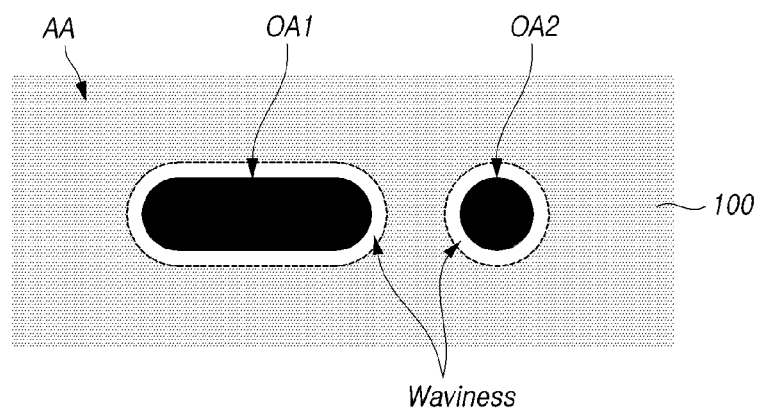
FIG. 5 is a view exemplarily illustrating a phenomenon in which display quality deteriorates around an open area in a display device in a case of not including a planarization layer for mitigating waviness.

FIG. 5 is a view exemplarily illustrating a phenomenon in which display quality deteriorates around an open area OA in a display device 100 in a case of not including a planarization layer PCL2 for mitigating waviness.

Referring to FIG. 5, as the substrate is removed from at least a partial area of the open area OA, a defect in the form of a band surrounding the open area OA may be recognized.

One of the reasons why the band-shaped defect occurs may be sinking of the polarizing plate (not shown) disposed on the front surface of the display panel as at least a portion of the substrate is removed.

In other words, the polarization plate, which is disposed on the front surface of the display panel to prevent deterioration of visibility of the display device 100 due to reflection of the external light by a metallic material disposed on the display panel, sinks around the open area OA, thereby causing a defect, such as a band shape perceived around the open area OA.

The phenomenon in which a band-shaped defect is recognized around the open area OA is also referred to as waviness.

Such waviness may cause deterioration of display quality and needs to be addressed.

Figure 6:
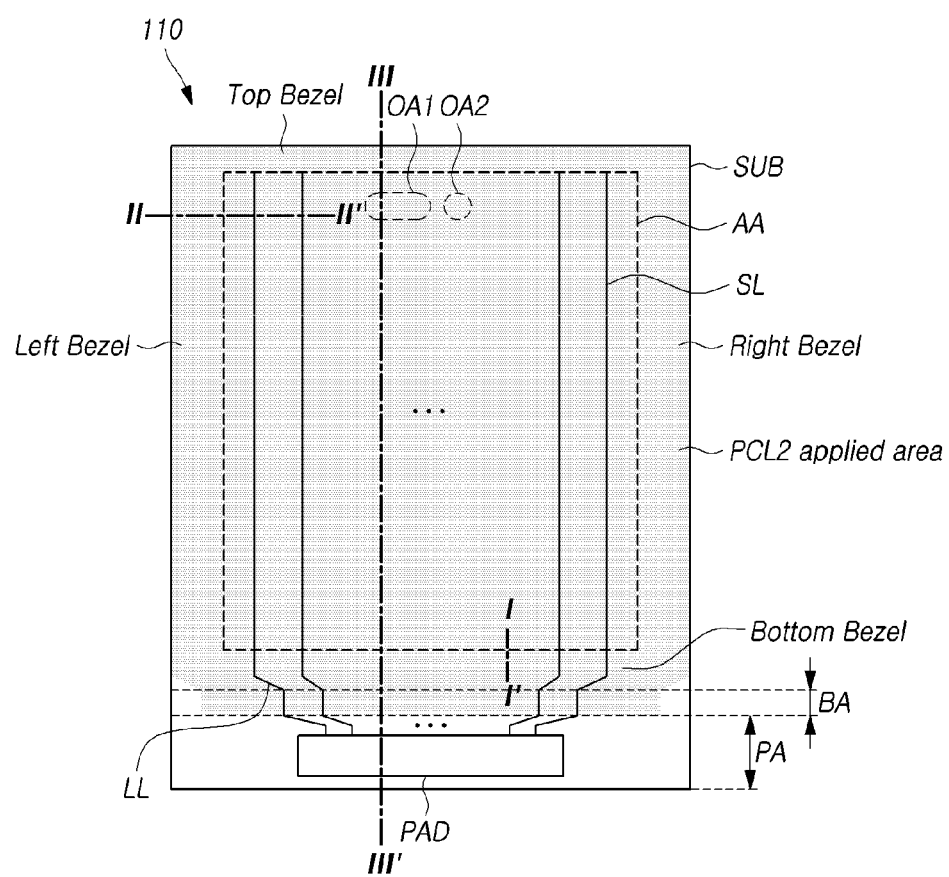
FIG. 6 is a view illustrating a display panel including a planarization layer for mitigating waviness in a display device according to embodiments of the disclosure.

FIG. 6 is a view illustrating a display panel including a planarization layer PCL2 for mitigating waviness in a display device 100 according to embodiments of the disclosure.

Referring to FIG. 6, a display device according to embodiments of the disclosure may include a planarization layer PCL2 disposed on the display area AA and at least a partial area of the non-display area NA.

Referring to FIG. 6, the planarization layer PCL2 may be disposed to overlap the open area OA. The planarization layer PCL2 may be disposed on the open area OA and the display area AA surrounding the open area OA.

The planarization layer PCL2 may be disposed on the protection layer PAC (refer to FIG. 3).

The planarization layer PCL2 may be formed of the same material as the second encapsulation layer PCL1 and be applied and disposed on the substrate SUB. The planarization layer PCL2 may be applied on the substrate SUB and may be cured by ultraviolet light. The planarization layer PCL2 may include a photoinitiator (not shown), which is a material for initiating a polymerization reaction by ultraviolet light.

The planarization layer PCL2 may be an acrylic resin, an epoxy resin, polyimide, polyethylene, or silicon oxycarbonate (SiOC) and be formed of an organic insulating material. For example, the planarization layer PCL2 may be formed through an inkjet scheme.

Referring to FIG. 6, the display panel 110 according to embodiments of the disclosure may include a display area AA and a non-display area around the display area AA.

The non-display area may include a bezel area, a bending area BA, and a pad area PA.

A plurality of subpixels for displaying an image are positioned in the display area AA. One or more signal lines SL are disposed in the display area AA.

The signal lines SL may include data lines for supplying data signals to the subpixels and gate lines for supplying gate signals to the subpixels.

The signal line SL shown in FIG. 6 may include a touch sensor embedded in the display panel 110. For example, a touch driving signal output from a touch driving circuit may be input to the signal line SL. For example, the data voltage output from the data driving circuit may be applied to the signal line SL.

The signal line SL is assumed below to be a data line for supplying a data signal to the subpixel, but is not limited thereto.

Referring to FIG. 6, the bezel area may be positioned around the display area AA. For example, a top bezel may be positioned above the display area AA, a left bezel may be positioned on the left side of the display area AA, a right bezel may be positioned on the right side of the display area AA, and a bottom bezel may be positioned below the display area AA.

In the bezel area, the gate driving circuit may be disposed in a gate-in-panel (GIP) type, or the gate driving circuit may be disposed in a chip-on-glass (COG) type or a chip-on-film (COF) type.

In the bezel area, the data driving circuit may be connected to the display panel 110 in a tape automated bonding (TAB) manner. Alternatively, in the pad portion PAD of the non-display area, the data driving circuit may be connected to the display panel 110 in a chip-on-glass (COG) manner or a chip-on-panel (COP) manner. Alternatively, the data driving circuit may be implemented in a chip-on film (COF) fashion and be connected to the display panel 110 in the bezel area.

In FIG. 6, the bending area BA and the pad area PA are shown as distinguished from the bottom bezel. However, the bending area BA and the pad area PA may be included in the bottom bezel. In the disclosure, for convenience of description, the bottom bezel and the bending area BA are described as distinguished from each other, but the display device according to embodiments of the disclosure is not limited thereto.

Referring to FIG. 6, the bending area BA and the pad area PA may be positioned under the bottom bezel.

The substrate constituting the display panel 110 may be bent in the bending area BA, and the pad area PA is positioned on the rear surface of the display area AA.

A plurality of link lines LL for electrically connecting the pad portion PAD and the signal line SL are disposed in the bending area BA.

In the bending area BA, the plurality of link lines LL are disposed in a direction perpendicular to the bending axis. The plurality of link lines LL may be disposed on at least one of the upper and lower sides of the bending area BA in an oblique direction inclined from the vertical direction.

The pad portion PAD may include at least one pin for transferring the signal input from the outside to the signal line SL or for transferring the signal input from the signal line SL to the outside.

For example, if the signal line SL is a data line, the pad portion PAD is connected to the data driving circuit, and the pad portion is electrically connected to the data lines of the display area AA through the plurality of link lines LL.

When the data driving circuit is positioned in a chip-on panel (COP) manner, the data driving circuit may be positioned on the pad portion PAD.

Referring to FIG. 6, the planarization layer PCL2 may be positioned to overlap the left bezel, the right bezel, the top bezel, or the bottom bezel.

The planarization layer PCL2 may be positioned in the bending area BA. Accordingly, the planarization layer PCL2 may be positioned to overlap the plurality of link lines LL. The planarization layer PCL2 may function to protect the plurality of link lines LL from, e.g., external impact. Accordingly, a micro cover layer (also referred to as MCL) partially disposed on the plurality of link lines LL may be omitted, thereby simplifying the process.

The planarization layer PCL2 may be disposed over the entire area or at least a partial area of the bending area BA. Accordingly, the bending area BA may have both an area in which the planarization layer PCL2 is positioned and an area in which the planarization layer PCL2 is not positioned.

Accordingly, the planarization layer PCL2 may be disposed to extend from the display area AA to the bending area BA, thereby enhancing display quality around the open area OA and protecting the plurality of link lines LL in the bending area BA.

Figure 7:
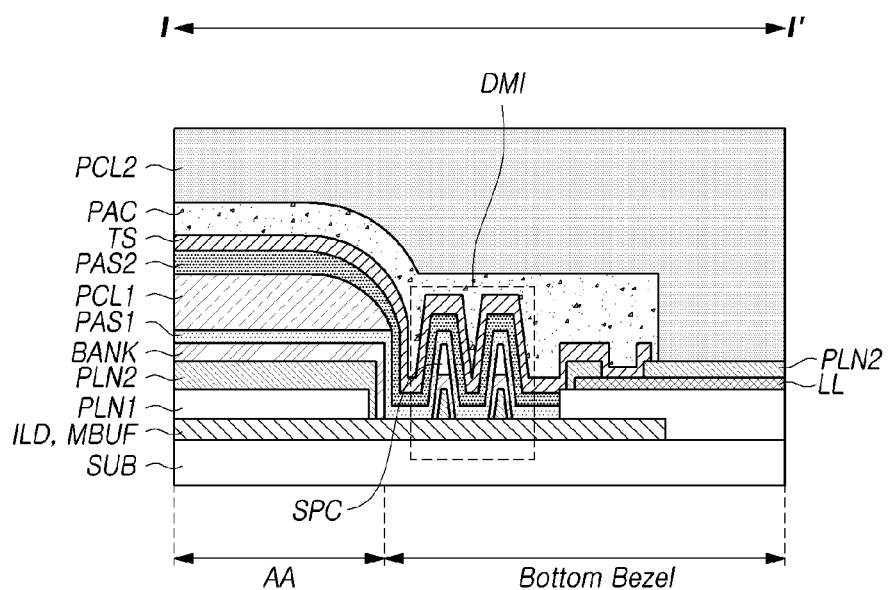
FIG. 7 is a cross-sectional view taken along line I-I' of FIG. 6 in a display panel according to embodiments of the disclosure.

FIG. 7 is a cross-sectional view taken along line I-I' of FIG. 6 in a display panel according to embodiments of the disclosure.

Referring to FIG. 7, in the display device according to embodiments of the disclosure, the planarization layer PCL2 is positioned on the touch sensor TS.

The planarization layer PCL2 may be positioned on the protection layer PAC in the display area AA and at least a partial area of the bottom bezel.

In some cases, the display device according to embodiments of the disclosure may further include an outer dam (not shown) configured to prevent the planarization layer PCL2 from overflowing. The outer dam may include one or more dam structures.

Referring to FIG. 6, the thickness of the planarization layer PCL2 may be larger than the thickness of the protection layer PAC.

For example, the protection layer PAC may be formed of a thermally cured material. Accordingly, it is difficult to form the protection layer PAC thick enough to compensate for the step in the open area. Accordingly, as the planarization layer PCL2 is formed of a different material from that of the protection layer PAC, it may be formed to have a thickness enough to compensate for the step in the open area. For example, the thickness of the planarization layer PCL2 may be about 14 µm or more.

A second planarization layer PLN2 may be disposed on the link lines LL, and the planarization layer PCL2 may be positioned on the second planarization layer PLN2.

Since the second planarization layer PLN2 is formed for the purpose of compensating for the step due to the formation of the source electrode and the drain electrode of the thin film transistor, the second planarization layer PLN2 is formed to have a relatively small thickness.

Accordingly, mere placement of the second planarization layer PLN2 on the plurality of link lines LL may not suffice in protecting the plurality of link lines from external impact. Thus, it is possible to further protect the plurality of link lines LL by placing the planarization layer PCL2 on the second planarization layer PLN2.

Figure 8:
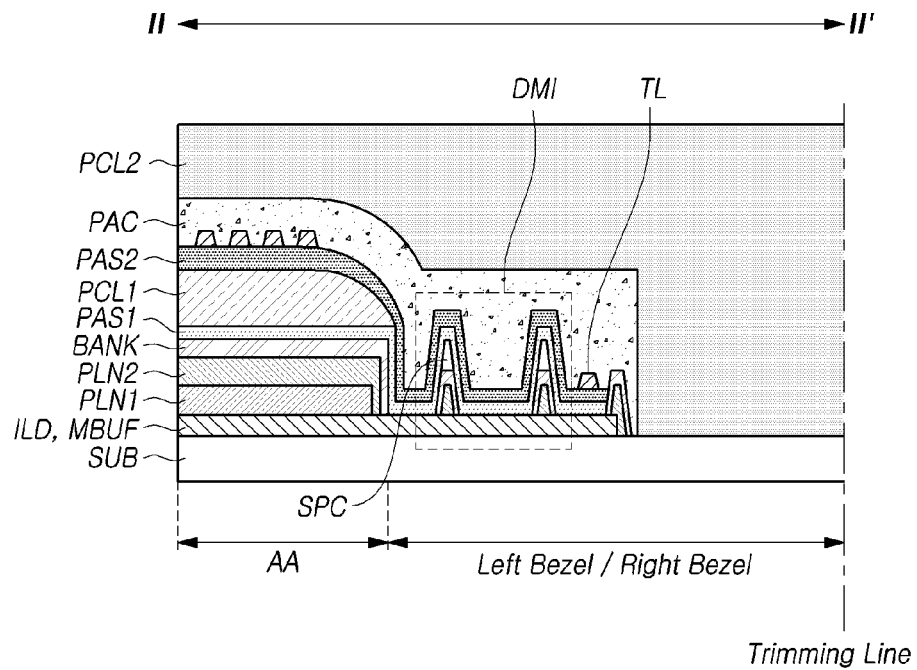
FIG. 8 is a cross-sectional view taken along line II-II' of FIG. 6 in a display panel according to embodiments of the disclosure.

FIG. 8 is a cross-sectional view taken along line II-II' of FIG. 6 in a display panel according to embodiments of the disclosure.

Referring to FIG. 8, one end of the planarization layer PCL2 may be aligned with one end of the substrate SUB. For example, one end of the planarization layer PCL2 may be aligned with one end of the substrate SUB in the left bezel or the right bezel.

The planarization layer PCL2 may be cut along a trimming line together with the substrate SUB.

Accordingly, traces of cutting along the trimming line may be left on the end of the planarization layer PCL2.

Accordingly, one end of the planarization layer PCL2 may be disposed in a direction perpendicular to the bottom surface of the substrate SUB without a curved surface due to surface tension of the liquid or so.

Referring to FIG. 8, the inner dam DMI may include one or more dam structures. The planarization layer PCL2 may be disposed on the inner dam DMI.

The inner dam DMI may include a dam structure having two or more layers. For example, the dam structure may include a bank BANK. For example, the dam structure may include a spacer SPC.

Referring to FIG. 8, the planarization layer PCL2 may contact the substrate SUB. In an area where the multi-buffer layer MBUF is not positioned on the substrate SUB, the planarization layer PCL2 may contact the substrate SUB.

Accordingly, in the display device according to embodiments of the disclosure, waviness defects that may occur in the edge area (e.g., the bezel area adjacent to the open area) of the display area AA may be mitigated.

Figure 9:
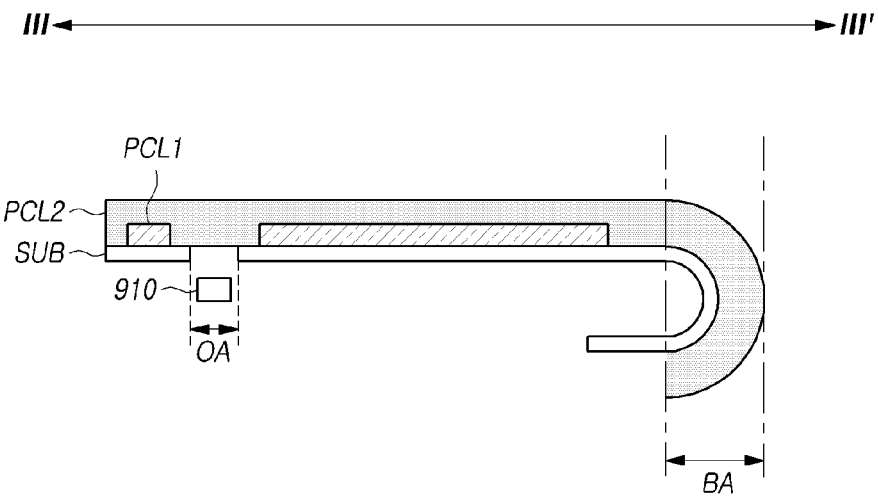
FIG. 9 is a cross-sectional view taken along line III-III' of FIG. 6 in a display panel according to embodiments of the disclosure.

FIG. 9 is a cross-sectional view taken along line III-III' of FIG. 6 in a display panel according to embodiments of the disclosure.

Referring to FIG. 9, in the display device according to embodiments of the disclosure, at least a portion of the substrate SUB is removed from the open area OA.

The electro-optical device 910 may be disposed in an area that at least partially overlaps the open area OA.

As components positioned on the substrate SUB, only the second encapsulation layer PCL1 and the planarization layer PCL2 are simply illustrated.

The second encapsulation layer PCL1 is positioned not to overlap the open area OA. In contrast, the planarization layer PCL2 may be positioned to overlap the open area OA.

The planarization layer PCL2 may be positioned on the substrate SUB in the bending area BA in which the substrate SUB is bent. In the bending area BA, the planarization layer PCL2 may be bent along the bending direction of the substrate SUB. In the bending area BA, the planarization layer PCL2 may be bent to the rear surface of the substrate SUB.

Accordingly, the display area around the open area OA may be planarized by the planarization layer PCL2.

Figure 10:
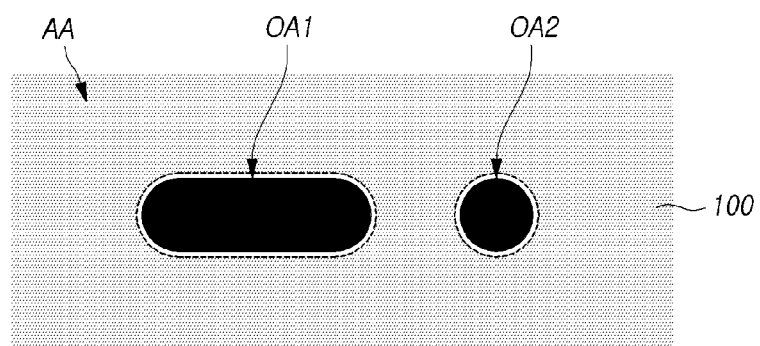
FIG. 10 is a view illustrating an embodiment in which waviness is significantly mitigated in a display device according to embodiments of the disclosure.

FIG. 10 is a view illustrating an embodiment in which waviness is significantly mitigated in a display device according to embodiments of the disclosure.

Referring to FIG. 10, since the display device according to embodiments of the disclosure further includes a planarization layer, waviness around the open area OA is greatly mitigated.

Thus, embodiments of the disclosure may provide a display device with enhanced display quality around an open area.

The foregoing embodiments of the disclosure are briefly described below.

Embodiments of the disclosure may provide a display device 100 comprising a substrate SUB, a display area AA where one or more subpixels SP are disposed, each of the one or more subpixels SP including a light emitting element ED positioned on the substrate SUB and at least one transistor (e.g., the driving transistor DRT) for driving the light emitting element ED, an open area OA obtained by removing at least a portion of the substrate SUB in an area surrounded by the display area AA, and a planarization layer PCL2 positioned to overlap the display area AA and the open area OA and positioned on the light emitting element ED.

Embodiments of the disclosure may provide the display device 100, wherein the open area OA is a non-display area NA where no image is displayed.

Embodiments of the disclosure may provide the display device 100, wherein the non-display area NA further includes a bending area BA in which at least a portion of the substrate SUB is bent around the display area AA, and wherein the planarization layer PCL2 is positioned to extend from the display area AA to the bending area BA.

Embodiments of the disclosure may provide the display device 100, wherein in the bending area BA, the planarization layer PCL2 is disposed to be bent along a bending direction of the substrate SUB.

Embodiments of the disclosure may provide the display device 100, wherein the non-display area NA includes a pad area PA where a pad portion PAD where an integrated circuit (e.g., a source driver integrated circuit) is disposed is positioned, and wherein the bending area BA is positioned between the display area AA and the pad area.

Embodiments of the disclosure may provide the display device 100, wherein in the display area AA, a plurality of data lines DL electrically connected with the one or more subpixels SP are disposed on the substrate SUB, and wherein a plurality of link lines LL electrically connected with the plurality of data lines DL are positioned between the substrate SUB and the planarization layer PCL2 in the bending area BA.

Embodiments of the disclosure may provide the display device 100, wherein the bending area BA includes both an area where the planarization layer PCL2 is positioned on the substrate SUB and an area where the planarization layer PCL2 is not positioned.

Embodiments of the disclosure may provide the display device 100, further comprising at least one encapsulation layer ENCAP positioned to cover the light emitting element ED in the display area AA, wherein the planarization layer PCL2 is positioned on the at least one encapsulation layer ENCAP.

Embodiments of the disclosure may provide the display device 100, wherein the at least one encapsulation layer ENCAP includes an organic encapsulation layer PCL1 including an organic material, and wherein the planarization layer PCL2 and the organic encapsulation layer PCL1 are formed of a same material.

Embodiments of the disclosure may provide the display device 100 further comprising a touch sensor TS positioned on the at least one encapsulation layer ENCAP and receiving a touch driving signal for touch sensing, a touch driving circuit 160 applying the touch driving signal to the touch sensor TS, and a protection layer PAC positioned on the touch sensor TS, wherein the planarization layer PCL2 is positioned on the protection layer PAC.

Embodiments of the disclosure may provide the display device 100, wherein the planarization layer PCL2 is thicker than the protection layer PAC.

Embodiments of the disclosure may provide the display device 100, wherein the planarization layer PCL2 further includes a photoinitiator, and wherein the photoinitiator is a material that initiates polymerization by ultraviolet light.

Embodiments of the disclosure may provide the display device 100, wherein an end of the planarization layer PCL2 is aligned with an end of the substrate SUB.

Embodiments of the disclosure may provide the display device 100, wherein an end of the planarization layer PCL2 is positioned perpendicular to a bottom surface of the substrate SUB.

Embodiments of the disclosure may provide the display device 100, wherein the planarization layer PCL2 is configured to compensate for a step due to the removal of the substrate SUB between the open area OA and the display area AA.

Embodiments of the disclosure may provide the display device 100, wherein one or more electro-optical devices 910 are disposed in an area at least partially overlapping the open area OA.

Embodiments of the disclosure may provide the display device 100, wherein at least one portion of the planarization layer PCL2 contacts the substrate SUB.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:
    a substrate;
    a display area;
    one or more subpixels disposed in the display area, each of the one or more subpixels including a light emitting element positioned on the substrate and at least one transistor for driving the light emitting element;
    an open area through the substrate, the open area being surrounded by the display area;
    an encapsulation layer on the display area and overlapping the one or more subpixels; and
    a planarization layer on the substrate, including on the display area, on the open area, and on each of the light emitting elements of the one or more subpixels, the planarization layer extending beyond the encapsulation layer toward a first end of the substrate.

2. The display device of claim 1, wherein the open area is a non-display area where no image is displayed.

3. The display device of claim 2, wherein the non-display area further includes a bending area in which at least a portion of the substrate is bent around the display area, and
    wherein the planarization layer extends from the display area to the bending area.

4. The display device of claim 3, wherein in the bending area, the planarization layer is disposed to be bent along a bending direction of the substrate.

5. The display device of claim 3, wherein the non-display area includes a pad area where a pad portion where an integrated circuit is disposed is positioned, and
    wherein the bending area is positioned between the display area and the pad area.

6. The display device of claim 3, wherein in the display area, a plurality of data lines electrically connected with the one or more subpixels are disposed on the substrate, and
    wherein a plurality of link lines electrically connected with the plurality of data lines are positioned between the substrate and the planarization layer in the bending area.

7. The display device of claim 3, wherein the bending area includes both an area where the planarization layer is positioned on the substrate and an area where the planarization layer is not positioned.

8. The display device of claim 1,
    wherein the planarization layer includes a different material from the at least one-encapsulation layer.

9. The display device of claim 1, wherein the encapsulation layer includes an organic encapsulation layer including an organic material, and
    wherein the planarization layer and the organic encapsulation layer are formed of a same material.

10. The display device of claim 1, further comprising:
    a touch sensor positioned on the at least one encapsulation layer and receiving a touch driving signal for touch sensing;
    a touch driving circuit applying the touch driving signal to the touch sensor; and
    a protection layer positioned on the touch sensor,
    wherein the planarization layer is positioned on the protection layer.

11. The display device of claim 10, wherein the planarization layer is thicker than the protection layer.

12. The display device of claim 1, wherein the planarization layer further includes a photoinitiator, and
    wherein the photoinitiator is a material that initiates polymerization by ultraviolet light.

13. The display device of claim 1, wherein an end of the planarization layer is aligned with the first end of the substrate.

14. A display device, comprising:
    a substrate having a first surface opposite from a second surface;
    a display area on the first surface of the substrate, the display area including:
        a plurality of subpixels on the first surface of the substrate;
    an open area that extends through the substrate from the first surface to the second surface of the substrate;
    an encapsulation layer on the display area; and
    a planarization layer is on the encapsulation layer, on the display area, across the open area, and in contact with a portion of the substrate that is beyond the encapsulation layer.

15. The display device of claim 14, comprising a step at a transition between the open area and the display area, the planarization layer compensates for the step.

16. The display device of claim 14, wherein one or more electro-optical devices are at least partially overlapping the open area.

17. The display device of claim 14, wherein the planarization layer covers overlaps the encapsulation layer and overlaps portions of the first surface of the substrate not overlapped by the encapsulation layer.

18. The display device of claim 15, wherein a surface of the planarization layer does not sink about the open area.

19. A device, comprising:
- a substrate having a first surface and a second surface;
- an active area formed on the first surface of the substrate, the active area including a plurality of subpixels;
- an open area surrounded by the active area, the open area being through the substrate from the first surface to the second surface;
- an encapsulation layer on the active area and on the plurality of subpixels; and
- an planarization layer on the first surface of the substrate, on the encapsulation layer, on the active area, and on the open area, the planarization layer extending to at least one end of the substrate, and the encapsulation layer being offset from the at least one end of the substrate.

20. The device of claim 19 wherein the substrate includes a bending area that is spaced from the open area by a portion of the active area, the planarization layer on the bending area, and the encapsulation layer not on the vending area.

* * * * *

UNITED STATES PATENT AND TRADEMARK OFFICE
CERTIFICATE OF CORRECTION

| | | |
|---|---|---|
| PATENT NO. | : 12,141,431 B2 | Page 1 of 1 |
| APPLICATION NO. | : 18/065613 | |
| DATED | : November 12, 2024 | |
| INVENTOR(S) | : JunHo Yeo et al. | |

It is certified that error appears in the above-identified patent and that said Letters Patent is hereby corrected as shown below:

In the Claims

Column 18, Claim 8, Line 27:
"from the at least one-encapsulation layer." should read: --from the encapsulation layer.--.

Column 18, Claim 14, Line 61:
"layer is on the" should read: --layer on the--.

Column 19, Claim 17, Line 5:
"layer covers overlaps" should read: --layer overlaps--.

Signed and Sealed this
Eleventh Day of February, 2025

Coke Morgan Stewart
*Acting Director of the United States Patent and Trademark Office*